US012784167B2

(12) United States Patent
Duchene et al.

(10) Patent No.: US 12,784,167 B2
(45) Date of Patent: Nov. 3, 2026

(54) TOMOGRAPHIC ANALYSIS METHOD

(71) Applicant: SAFRAN AIRCRAFT ENGINES, Paris (FR)

(72) Inventors: Pierre Alfred Jean Duchene, Moissy-Cramayel (FR); Harmonie Celestin, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 258 days.

(21) Appl. No.: 18/837,521

(22) PCT Filed: Feb. 10, 2023

(86) PCT No.: PCT/FR2023/050183

§ 371 (c)(1),
(2) Date: Aug. 9, 2024

(87) PCT Pub. No.: WO2023/152454

PCT Pub. Date: Aug. 17, 2023

(65) Prior Publication Data

US 2025/0173849 A1 May 29, 2025

(30) Foreign Application Priority Data

Feb. 11, 2022 (FR) ...................................... 2201225

(51) Int. Cl.
*G06T 7/00* (2017.01)
*G01N 23/046* (2018.01)
(Continued)

(52) U.S. Cl.
CPC ......... *G06T 7/0002* (2013.01); *G01N 23/046* (2013.01); *G06T 5/20* (2013.01);
(Continued)

(58) Field of Classification Search
CPC ....... G01N 23/046; G06T 5/20; G06T 7/0002; G06T 7/0004; G06T 7/50; G06T 7/60;
(Continued)

(56) References Cited

U.S. PATENT DOCUMENTS

2016/0247271 A1* 8/2016 Hishida ................. G06T 7/0004

FOREIGN PATENT DOCUMENTS

FR 3104301 B1 6/2021
WO WO-9852011 A2 * 11/1998 ........... G06T 7/0012

OTHER PUBLICATIONS

International Search Report mailed Mar. 31, 2023, issued in corresponding International Application No. PCT/FR2023/050183, filed Feb. 10, 2023, 7 pages.

(Continued)

*Primary Examiner* — John Villecco
*Assistant Examiner* — Joshua B. Crockett
(74) *Attorney, Agent, or Firm* — Christensen O'Connor Johnson Kindness PLLC

(57) ABSTRACT

A method for carrying out tomographic analysis of a composite part comprising a matrix and fibers, the method including: acquiring at least one two-dimensional image of the part by a tomographic device, generating a plurality of shapes characteristic of the fibers and of convolution masks having a plurality of copies of the characteristic shape, computing, for each of the characteristic shapes, a product of convolution of the two-dimensional image with the corresponding convolution mask, and obtaining a convolution image, detecting a position corresponding to an overall maximum in all the obtained convolution images and attributing a fiber center to the position, marking as processed a region of the image placed around the fiber center, and iterating the steps of computing, detecting and marking on the unprocessed regions of the image.

9 Claims, 3 Drawing Sheets

(51) Int. Cl.
*G06T 5/20* (2006.01)
*G06T 7/50* (2017.01)
*G06T 7/60* (2017.01)
*G06T 7/73* (2017.01)

(52) U.S. Cl.
CPC .............. *G06T 7/0004* (2013.01); *G06T 7/50* (2017.01); *G06T 7/60* (2013.01); *G06T 7/73* (2017.01); *G06T 2207/10072* (2013.01); *G06T 2207/10081* (2013.01); *G06T 2207/30164* (2013.01)

(58) Field of Classification Search
CPC ............. G06T 7/73; G06T 2207/10072; G06T 2207/10081; G06T 2207/30164
See application file for complete search history.

(56) References Cited

OTHER PUBLICATIONS

Written Opinion mailed mailed Mar. 31, 2023, issued in corresponding International Application No. PCT/FR2023/050183, filed Feb. 10, 2023, 8 pages.

Emerson et al.; Individual fibre segmentation from 3D X-ray computed tomography for characterising the fibre orientation in unidirectional composite materials; Composites: Part A, Jan. 11, 2017; pp. 83-92; vol. 97; Elsevier Ltd.

Krause et al.; “Determination of the fibre orientation in composites using the structure tensor and local X-ray transform”; Journal of Material Science; Feb. 1, 2010; pp. 888-896; vol. 45; No. 4; Kluwer Academic Publishers.

Sencu et al.; “Generation of micro-scale finite element models from synchrotron X-ray CT images for multidirectional carbon fibre reinforced composites”; Composites: Part A; Sep. 12, 2016; pp. 85-95; vol. 91; Elsevier Ltd.

* cited by examiner

TOMOGRAPHIC ANALYSIS METHOD

CROSS-REFERENCE TO RELATED APPLICATIONS

This application is a National Stage of International Application No. PCT/FR2023/050183, filed Feb. 10, 2023, which claims priority to French Patent Application No. 2201225, filed Feb. 11, 2022, the entire disclosures of which are hereby incorporated by reference in their entirety for all purposes.

FIELD OF THE INVENTION

The invention relates to a method for tomographic analysis of a mechanical part. The part is for example part of an aircraft, and more specifically a turbomachine, like a part of a fan housing, a fan vane or a part of a fixed shroud structure.

DESCRIPTION OF RELATED ART

Inspecting structural mechanical parts by tomographic methods, for example radiographic or acoustic, is known for detecting the presence of possible surface and internal defects of the part.

These methods are reliable, noninvasive and allow inspection of the interior of the parts, which makes it possible to rule quickly on the state of the part or decide on the potential thereof for return to operation or replacement thereof.

A tomographic measurement consists of scanning an observed object, here a mechanical part, by means of a wave beam, and in a measurement of the beam transmitted in all directions in order to reconstitute a three-dimensional image of the object.

FIG. 1 shows a tomographic device 1 during the inspection of the mechanical part 20.

The tomographic device 1 comprises at least one emitting device 3 configured for emitting an incident beam 5 of wave pulses towards the part 20, for example radiofrequency waves, x-rays or even acoustic waves, and at least one receiver 7 able to capture a transmitted beam 9 of waves, arranged on both sides of the part 20.

The part 20 is generally mounted on a support 11 rotating around an axis A, in order to be observed from all directions during the tomographic measurement.

The part 20 observed by tomography may be made up of a composite material, such as shown in detail in FIG. 2, which comprises several distinct phases comprising different materials.

Such composite material comprises for example warp fibers 21 and weft fibers 22 woven with each other on a weaving plane P, or several weaving planes P superposed along the thickness direction Z. Such weaving is designated as two-dimensional. These fibers 21, 22 are also designated by the term strands, and these two terms are used interchangeably in the following. The fibers of the composite material may alternatively follow a three-dimensional weaving with fibers extending along three distinct directions.

The fibers 21 and 22 may be carbon, glass or synthetic polymer (for example Kevlar type (registered trademark)) fibers, or a mixture of several types of fibers. They are embedded in a matrix 23 comprising for example one or more polymers and/or resins, which solidify to form the final part 20.

The amplitudes of the transmitted waves at different observation angles are rendered in grayscale in the processing device 13, and digital analysis serves to reconstitute the volume of the part 20. The processing device 13 comprises a computer.

The resulting grayscale depends on, among other things, the density of the materials traversed, and therefore varies between the various phases of the composite material.

Tomographic analysis then serves to obtain a display of the exterior and interior of the part. This type of control has the major advantage of allowing display in the depth of the material and of the parts studied, while being nondestructive and reliable.

A human operator may then evaluate the quality of the part, by identifying the various phases of the part and by studying the weaving plan, in order to detect the possible presence of an anomaly or damage.

In fact, many mechanical properties of the final part depend on the good strength of the woven fibers, which may be evaluated by several indicators. In particular, the warp/weft ratio and the volume density of fiber may be cited. These parameters may also vary even within the weave with different sized strands or other.

In the following, the terms “noncompliance,” “anomaly,” “damage,” or equivalents are used without distinction for designating a portion of the part where the mechanical properties of the part are locally degraded compared to those from a part in good condition.

It may also involve the presence of a foreign body in the material, like a void (porosity) or a material that came to be in the part by error during shaping thereof. Such an anomaly may justify a removal and replacement of the part when the mechanical strength thereof is compromised, or, according to the case, may not be contrary to the proper operation of the part.

In the case of a composite material, it may also involve an area where the fibers 21, 22 are distended or broken.

It is important to note that analysis of the tomographic image is currently always left to the human operator, who must separate the fibers and the matrix, and study the weaving manual.

This step generates a significant delay because the three-dimensional image is complex and extended, which makes inspection thereof tedious.

BRIEF SUMMARY OF THE INVENTION

The invention aims to remedy these disadvantages, by proposing an analysis method automatically supplying information on the distribution of fibers in a radiographic image. Such information allows for example a digital reconstruction of the volume of the observed part.

For this purpose, the object of the invention is a method for tomographic analysis of a composite part comprising a matrix and fibers embedded in the matrix, where the method comprises the following steps:

- acquiring at least one two-dimensional image of the part by means of a tomographic device;
- generating a plurality of characteristic shapes of the fibers and, optionally, for each characteristic shape, a convolution mask comprising a plurality of copies of the characteristic shape;
- calculating, for each of the characteristic shapes, a convolution product of the two-dimensional image with the characteristic shape or with the corresponding convolution mask, and obtaining a convolution image;
- detecting a position in the two-dimensional image corresponding to a global maximum overall the resulting convolution images for each of the characteristic shapes, and assignment of the fiber center to said position;

marking as processed a region of the image placed around the fiber center and corresponding to the characteristic shape for which the maximum was obtained; and iterating the steps of calculating, detecting and marking on the unprocessed regions of the image.

Such a method serves to automatically detect fibers in a two-dimensional image resulting from a section of a tomographic image, and thus to gather information on the positions, dimensions and orientations of the fiber in order to observe and/or model the part.

The method may comprise a step of preprocessing the image, comprising at least one among a filtering of an average value of the image, and removal of edges from the image.

With such a filtering step, parasitic effects resulting from the tomographic acquisition, like for example an overall gradient on the image, can be overcome.

The filtering may be done by means of a Gaussian median type filter.

The acquisition step for the at least one two-dimensional image may comprise the acquisition of a three-dimensional image of the part by means of the tomographic device and the implementation of at least one planar section in the three-dimensional image to obtain each two-dimensional image.

Such a step serves to generate from the tomographic results several two-dimensional images oriented along different directions of interest of the part.

The characteristic shapes of the fibers may be ellipses.

Such a geometry allows effectively detecting and obtaining useful information about the orientation and the arrangement of the fibers, while also remaining sufficiently simple for limiting the calculation time.

Among the generated characteristic shapes, at least two characteristic shapes may have different dimensions from each other.

Such a characteristic can be used to consider variations in the dimensions of the fibers in the part.

In the case where the characteristic shapes are ellipses, the dimensions are for example the length of the major axis and the length of the minor axis of each ellipse.

Among the generated characteristic shapes, at least two characteristic shapes may have different inclinations from each other relative to a reference direction of the two-dimensional image.

Such a characteristic can be used to consider variations in the orientation of the fibers in the part and thus to improve detection.

Among the convolution masks generated, at least two convolution masks may comprise characteristic shapes arranged with different separations between said two convolution masks. Such a characteristic can be used to consider local variations in the arrangement of the fibers and thus to improve detection.

The separations are for example measured between the centers of two neighboring fibers.

The part may be a part of a turbomachine housing, or a vane of a compressor rotor, stator or fan of the turbomachine.

The invention also relates to a computer program product comprising instructions with which to implement the method when it is executed in a computer.

BRIEF DESCRIPTION OF THE DRAWINGS

Figure 1:
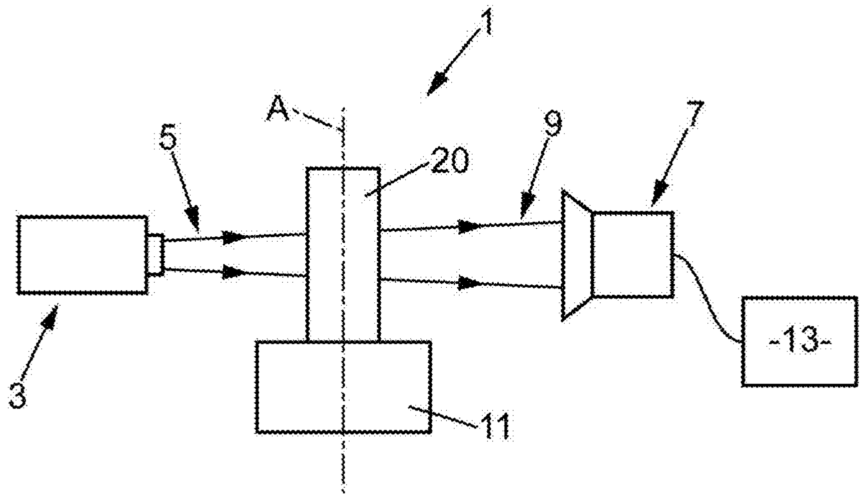
FIG. 1 is a schematic side view of a tomographic device during implementation of a method according to the invention.

A method for tomographic analysis according to the invention is now going to be described. This method implements the analysis device 1 previously described in connection with FIG. 1 for observing a part 20.

Figure 2:
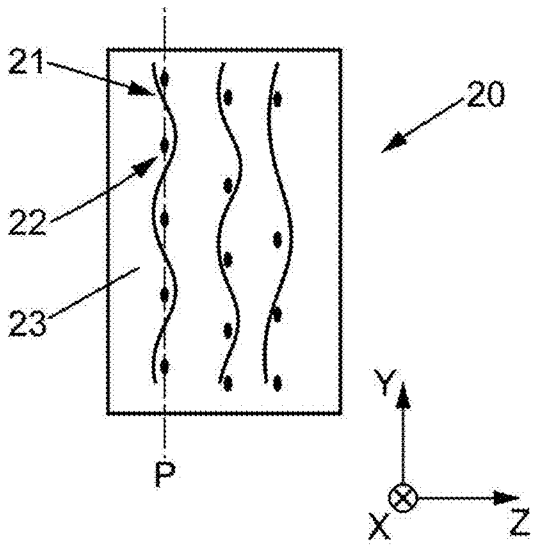
FIG. 2 is a detailed schematic view of a part of woven composite material.

The part 20 is for example made of composite material, such as shown on FIG. 2.

The composite material comprises warp fibers 21 extending along a warp direction X and weft fibers 22 extending along the weft direction Y, embedded in the matrix 23. The average spacing between neighboring warp fibers 21 or weft fibers 22 is of order 2 mm.

A thickness of the part 20 measured along the thickness direction Z, is for example included between 5 and 25 mm, in particular near 10 mm for part 20 comprising 4 to 8 superposed tissue planes.

The warp fibers 21 and weft fibers 22 may be identical or different materials (glass, carbon or Kevlar (registered trademark)).

The matrix 23 comprises at least one organic polymer and/or at least one resin.

The woven composite materials may be considered as orthotropic materials, meaning materials having three planes of symmetry in the internal microstructure thereof.

Alternatively, the composite material may comprise warp fibers 21 and weft fibers 22 along with fibers extending along the thickness direction Z, thus forming a three-dimensional weave. The method aims to get information about the distribution of fibers 21, 22 in the matrix 23. To do that, the method aims to get the positions of the centers of the sections of the fibers 21, 22 and the dimensions and orientations of said sections of the fibers 21, 22 in at least one two-dimensional image corresponding to a section of the part 20 in a predetermined plane.

The method comprises a first step of acquiring at least one three image of the part 20 by means of the tomographic device 1.

An incident beam 5 of wave pulses is emitted by the emitting device 3 towards the part 20. The incident beam 5 is for example a radiofrequency wave beam.

The waves pass through the part 20, and the transmitted beam 9 coming from the part 20 is captured by the receiver 7. The resulting intensity distribution of the transmitted beam 9 is converted to a two-dimensional grayscale image of the part 20 by the processing device 13.

The part 20 is rotated by means of the support 11 and two-dimensional images of the part 20 are acquired from all directions.

Figure 3:
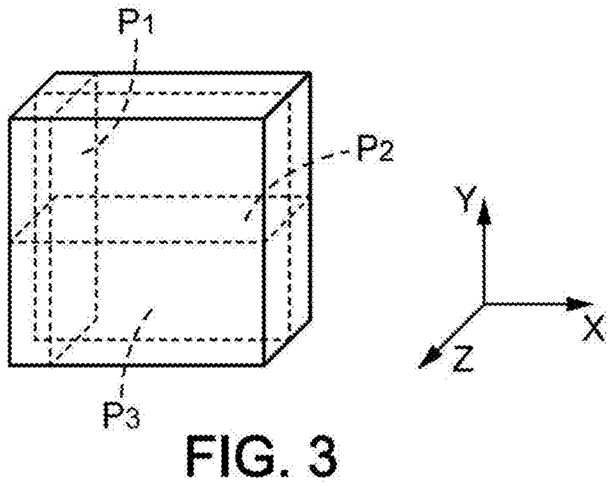
FIG. 3 is a schematic view of a step of preparation of images for the method according to the invention.

A three-dimensional image 30, shown in FIG. 3, of the part 20 in grayscale, or tomographic image, is then reconstructed by image processing by means of the processing device 13, where the image comprises a plurality of voxels each presenting a respective gray level.

The acquisition step next comprises the preparation of at least one two-dimensional image by taking, for each two-dimensional image, a section of the three-dimensional image 30 in a respective plane P1, P2, P3, as shown in FIG. 3.

Each section plane P1, P2, P3 may for example be perpendicular to the direction of the warp, to the direction of the weft or to the thickness direction.

The resulting two-dimensional images are substantially rectangular images, comprising a plurality of pixels each having a respective gray level.

The method advantageously comprises a pre-processing step for each two-dimensional image serving to improve getting results with the analysis method.

The preprocessing comprises filtering with an average gray level from the image, by using a median Gaussian filter.

In fact, the image may comprise a parasitic gray level gradient resulting from the tomographic acquisition, which may disrupt the subsequent analysis. This gradient can be eliminated for the remainder of the method by filtering on the average value.

On the other hand, the application of such a filter to the image may make the edges of the image unusable, so they then have to be eliminated. Pretreatment may then comprise a step of trimming the edges of the image and recentering the resulting image.

The method next comprises a step of generation of a plurality of characteristic shapes 40 of the fibers 21, 22 used for detecting the sections of the fibers in each two-dimensional image.

Figure 4:
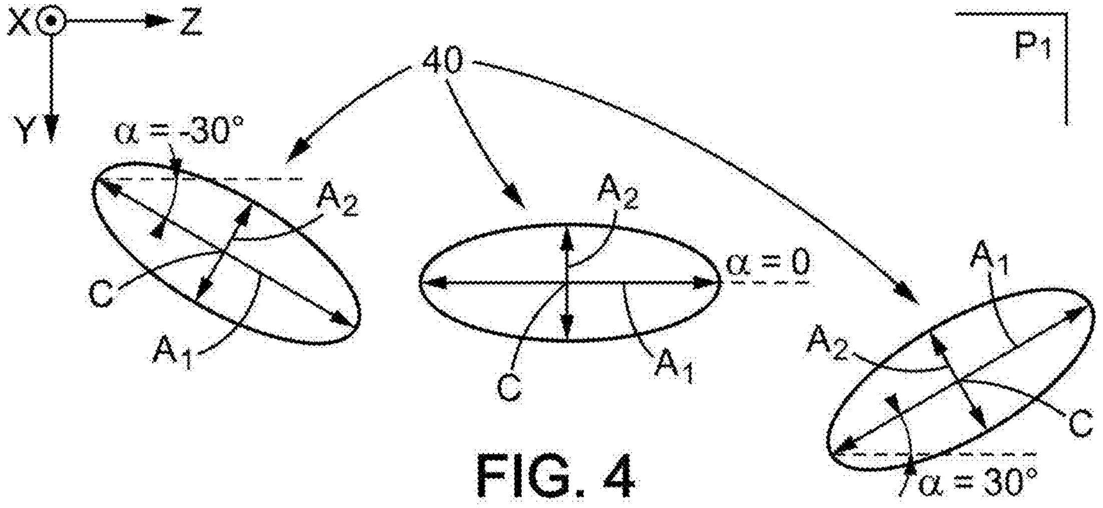
FIG. 4 is a schematic view of examples of characteristic shapes of strands used in the method according to the invention.

The characteristic shapes 40, shown in FIG. 4, are approximations of the section of a fiber 21, 22 in the image plane. They have, for example, elliptical shapes and each comprise a center C, a major axis A1 and a minor axis A2.

The position of an ellipse is defined by the center C thereof, the dimensions by the lengths of the major axis A1 and the minor axis A2 thereof, and the orientation thereof by an angle $\alpha$ formed between the major axis A1 and a reference direction from the image, for example the thickness direction Z in the example shown.

The dimensions of the characteristic shapes 40 may be determined by direct observation on the image of some number of fibers 21, 22, for example between 5 and 10, and by identification of associated average values and standard deviations.

Another method of determination of the dimensions of characteristic shapes is from knowledge of the initial fibers 21, 22 before the formation of the composite part 20 and the inclusion thereof in the matrix 23. The size of the composite shapes may then be obtained by applying a scale factor between the actual dimensions of the part and the size of the pixels in the image.

On the basis of this information, some 10 characteristic shapes 40 are generated with dimensions varying from one to another.

A more or less large number of characteristic shapes 40 may be determined, as a function of the available calculation time and of the desired precision.

Theoretically, the orientations of the characteristic shapes 40 could be arbitrary. However, in practice it is seen that the orientations correspond to angles $\alpha$ forming a distribution mostly included between −30° and 30° around a median orientation.

Thus, the method comprises the identification of this median orientation on the image by observation of some number of fiber sections 21, 22, and considering the orientations distributed around this median value at constant angular steps, for example 10° between −30° and 30° around the median orientation.

The combination of these orientations applied to the characteristic shapes 40 of multiple dimensions previously determined gives for example between 50 and 100 different characteristic shapes 40 which can be sought in the image.

According to the desired length of the calculations, the angular step may be increased or decreased to get more or fewer characteristic shapes 40.

Figure 5:
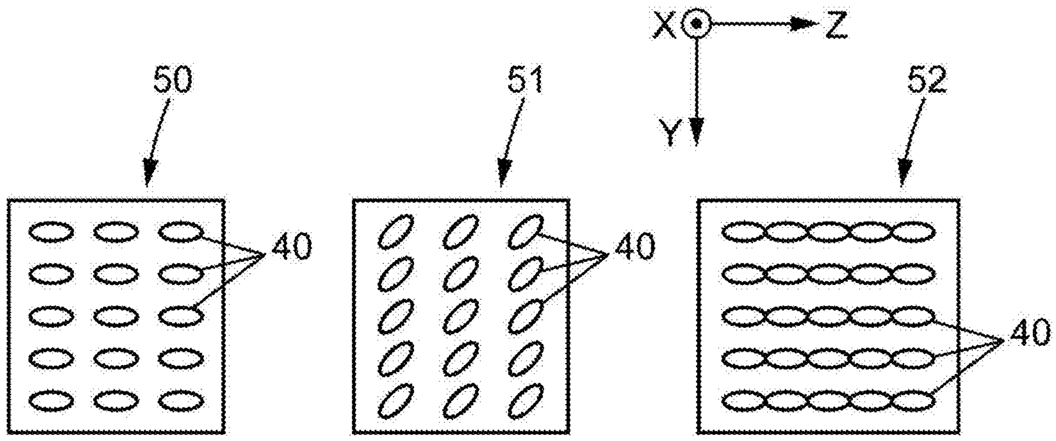
FIG. 5 is a view of examples of masks comprising a plurality of characteristic shapes from FIG. 4.

For each characteristic shape, the method comprises the preparation of at least one convolution mask 50, 51, 52, such as shown in FIG. 5, comprising a plurality of such identical characteristic shapes 40, arranged together to form a pattern.

The arrangement of the characteristic shapes 40 may change from one convolution mask 50, 51, 52 to another, by varying the separation between the characteristic shapes 40 or else the respective positions thereof.

For example, the first mask 50 comprises shapes oriented with an angle $\alpha$ that is zero, the second mask 51 shapes inclined with $\alpha$=30°, and the third mask 52 shapes oriented with an angle $\alpha$ that is zero and a reduced distance between the shapes along the thickness direction Z.

The method then comprises, for each of the convolution masks 50, 51, 52, a step of calculation of the convolution product of the two-dimensional image with the convolution mask, and obtaining a convolution image resulting from this calculation.

Alternatively, the calculation of the convolution product may be done with a characteristic shape 40.

The convolution calculation is then faster, but the results obtained are less sensitive to the variability of the strands.

The convolution calculation is done for each of the characteristic shapes 40, in other words, some tens of times, and for as many convolution images as are obtained.

The convolution images obtained by the calculation for each of the characteristic shapes 40 are then compared with each other, so as to detect a global maximum value over the set of convolution images.

The position in the two-dimensional image of the pixel giving said maximum value corresponds to the center of a strand, and the characteristic shape for which the maximum value was obtained provides the dimensions and orientation of the section of the strand in the section plane of the image.

The corresponding zone therefore corresponds to a detected strand and is marked as processed and excluded from subsequent iterations of the convolution calculation.

Figure 6:
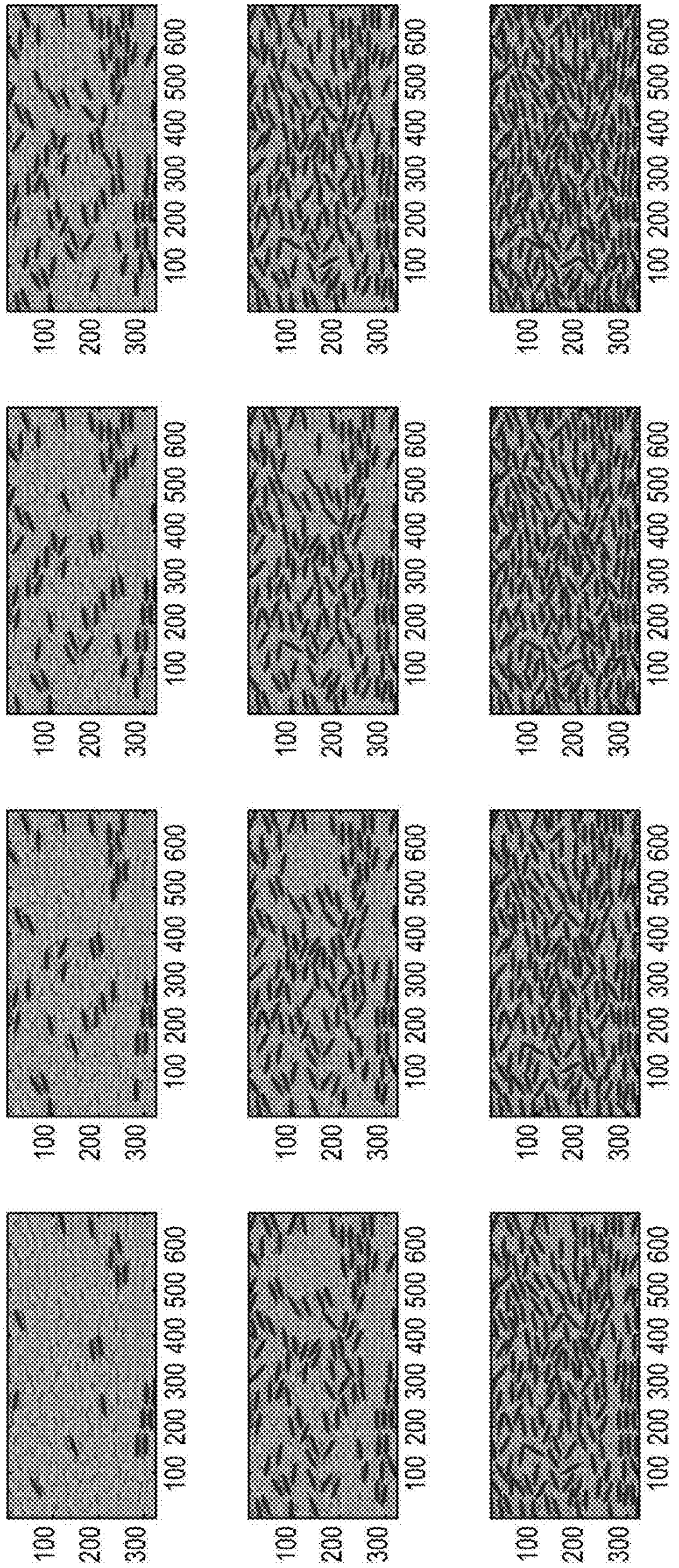
FIG. 6 is a schematic view of the progressive detection of strands in an image by the method according to the invention.

The steps of calculating convolution products, detecting the maximum over the convolution images obtained, and marking the corresponding zone as a new strand are reiterated over the unprocessed regions of the two-dimensional image, in order to detect the strands from the image one by one. The results that are progressively obtained are shown in FIG. 6.

The most obvious strands visible in the two-dimensional image are detected first, then the method progressively detects the less obvious strands.

This detection order serves to simplify the analysis of the most complex zones after excluding the previously detected strands.

The detected strands are advantageously displayed visually on the two-dimensional image, such that an operator may manually stop the detection method when they think a sufficient number of strands have been detected.

Alternatively, a criterion for stopping the method may be implemented, like for example a proportion of the surface of the image occupied by the strands beyond which it is thought that a sufficient number of strands have been detected. This proportion may be calculated as a function of the volume ratio of the fibers 21, 22 and of the matrix 23 in the part 20. This proportion is typically of order 60%.

At the end of the method, the resulting information is recorded, for possible processing and/or digital reconstruction of the part 20. This information comprises for each strand, the position of the center of the strand, the dimensions of the characteristic shape corresponding to the section of the strand, and the orientation thereof.

The method presented therefore allows an automatic identification of the strands in the part and obtaining corresponding data, without direct intervention of an operator. The strong points of this method are therefore the automation and the reduction of the risk of errors, while assuring a great versatility of the analysis, because of considering several parameters which may vary such as the size of the strands, the shape of the strands and also the orientation thereof around the center thereof.

The invention claimed is:

1. A method for tomographic analysis of a composite part having a matrix and fibers embedded in the matrix, the method comprising:

acquiring at least one two-dimensional image of the part by a tomographic device;

generating a plurality of characteristic shapes of the fibers and, optionally, for each characteristic shape, a convolution mask including a plurality of copies of the characteristic shape;

calculating, for each of the characteristic shapes, a convolution product of the two-dimensional image with the characteristic shape or with the corresponding convolution mask, and obtaining a convolution image;

detecting a position in the two-dimensional image corresponding to a global maximum over all of the resulting convolution images for each of the characteristic shapes, and assignment of a fiber center to the position;

marking as processed a region of the image placed around the fiber center and corresponding to the characteristic shape for which the maximum was obtained; and iterating the steps of calculating, detecting, and marking on the unprocessed regions of the image.

2. The method according to claim 1, further comprising preprocessing the image, wherein preprocessing the image includes filtering of an average value of the image, and/or removal of edges from the image.

3. The method according to claim 1, wherein the acquisition step for the at least one two-dimensional image may comprise the acquisition of a three-dimensional image of the part by means of the tomographic device and the implementation of at least one planar section in the three-dimensional image to obtain each two-dimensional image.

4. The method according to claim 1, wherein the characteristic shapes of the fibers are ellipses.

5. The method according to claim 1, wherein among the generated characteristic shapes, at least two characteristic shapes have different dimensions from each other.

6. The method according to claim 1, wherein among the generated characteristic shapes, at least two characteristic shapes have different inclinations from each other relative to a reference direction of the two-dimensional image.

7. The method according to claim 1, wherein among the convolution masks generated, at least two convolution masks comprise characteristic shapes arranged with different separations between the two convolution masks.

8. The method according to claim 1, wherein the part is a part of a turbomachine housing or a vane of a compressor rotor, stator, or fan of the turbomachine.

9. A non-transitory computer-readable medium having logic stored thereon that, in response to execution by one or more processors, performs the method according to claim 1.

* * * * *